Oct. 16, 1956     E. F. FREKKO     2,767,110
WASHING ELECTROLYTIC CAPACITOR SECTIONS
Filed July 17, 1952
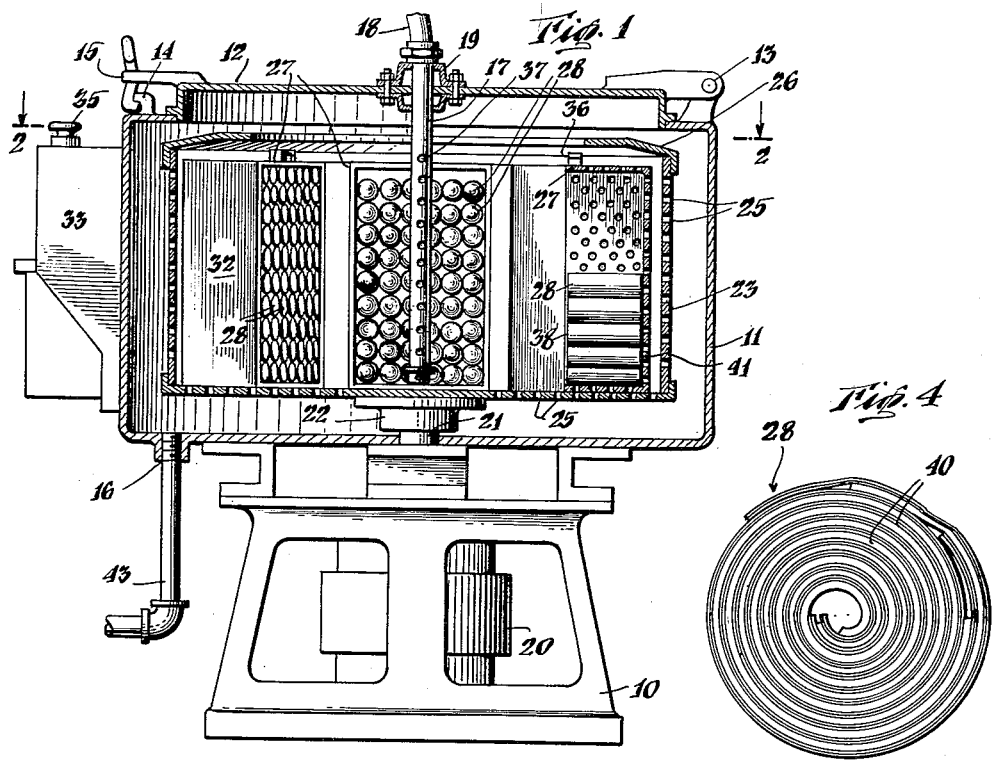
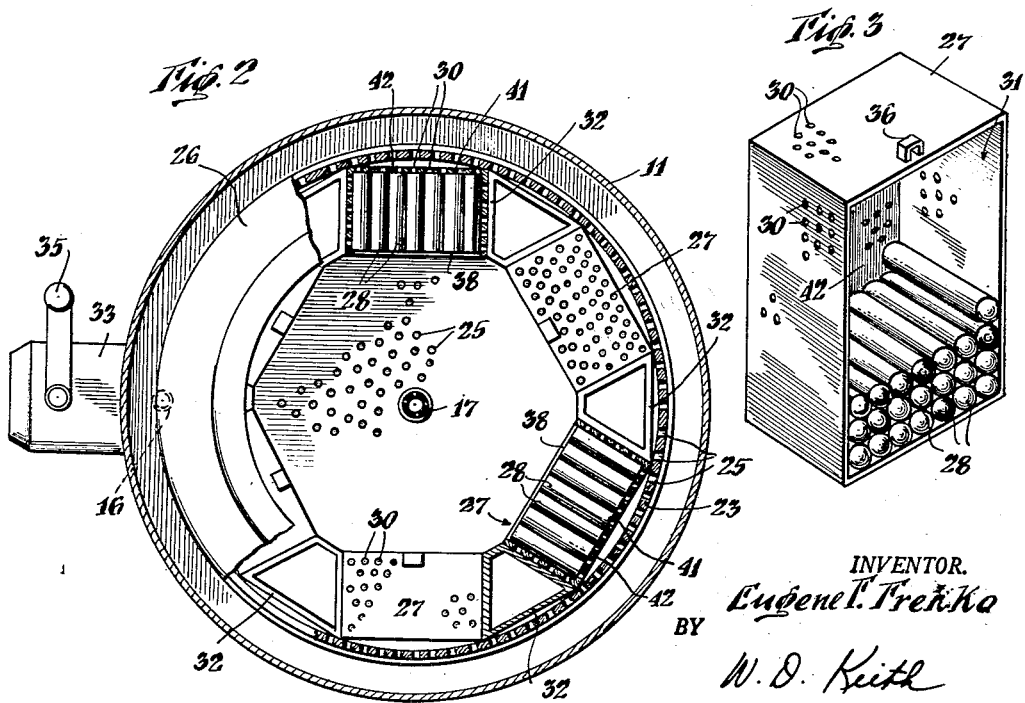
INVENTOR.
Eugene F. Frekko
BY
W. D. Keith
ATTORNEY

United States Patent Office

2,767,110
Patented Oct. 16, 1956

2,767,110

WASHING ELECTROLYTIC CAPACITOR SECTIONS

Eugene Francis Frekko, Westfield, N. J., assignor to Cornell-Dubilier Electric Corporation, South Plainfield, N. J., a corporation of Delaware Application July 17, 1952, Serial No. 299,348

4 Claims. (Cl. 134—23)

This invention relates to washing electrolytic capacitors, and more particularly to a method of producing an improved type of capacitor capable of operating for sustained periods of time at elevated temperatures without break-down.

As is generally known, an electrolytic capacitor consists of a film formed metallic anode and a metallic cathode separated from each other by an absorbent separator such as paper or cloth, and wherein such absorbent separator is impregnated with a film forming electrolyte.

The film forming metallic anode is, because of practical and economical considerations, usually composed of aluminum, and similarly the metallic cathode is also composed of aluminum for, in addition to the economic considerations, the electrodes of an electrolytic capacitor should be of substantially the same metal to prevent unwanted galvanic action.

When aluminum electrodes are used in electrolytic capacitors, it is essential in the production of high quality capacitors to minimize the quantities of undesirable, deleterious impurites. The particular impurities which are most deleterious to the production of high quality electrolytic capacitors employing aluminum electrodes are those materials which form anions by disassociation or by the action of an electric current and are those of the chemical class consisting of chlorides, sulfides and sulfates.

In present day production of high quality electrolytic capacitors, extreme care is exercised in maintaining great cleanliness of the constituent elements of the capacitors, and it is common in the production of such capacitors to wash and purify the surfaces of the electrodes and to select only high purity materials and chemical ingredients. It is also necessary to eliminate contamination of the respective parts which may result from handling these parts in the actual assembly of the capacitor. Such contamination is eliminated to a considerable degree by providing rubber gloves for the operators engaged in the assembly of the capacitors.

In the present practice most of the separator material consists of absorbent paper similar to blotting paper, and in its manufacture only paper pulp which meets rigid chemical analysis for freedom from impurities is used. However, in the manufacture of paper suitable for electrolytic capacitor separators, the felting process requires the use of large quantities of water. The use of such large quantities of water precludes the employment of chemically pure water such as distilled or deionized water, and in general the water supply for the manufacture of paper is obtained from streams which are subject to variable contamination during the several seasons of the year. Thus, some lots of absorbent separator paper may be relatively free of deleterious impurities and other lots of paper may be substantially unuseable for high quality electrolytic capacitors because of large quantities of impurities. The paper separator material may be tested for impurity content at the outer end of each roll, but such tests are not practical on inner parts or throughout the entire length of a roll of the paper separator material during the winding of the capacitor sections. However, it is possible that somewhere along the roll of such material certain spots may have been contaminated due to certain uncontrollable factors in the manufacture of the paper, such for example as the water. Therefore, it is possible that in spite of the most vigorous inspection, a capacitor section roll is produced with certain portions in it which have an impurity content higher than would be permissible for operation of such unit over the long operating life required of such capacitors and at the higher temperatures required during such life.

Since it was relatively impractical to test the paper rolls prior to their assembly into capacitor sections, some cleaning process was needed for substantially removing impurities after the electrolytic capacitor had been completed except for the impregnation with the electrolyte.

Therefore, it is an object of the present invention to substantially eliminate deleterious contamination incurred during the assembly or manufacture of electrolytic capacitors, and to minimize or substantially eliminate impurities contained in or on the surfaces of the various elements of electrolytic capacitors.

Another object of the invention is to minimize or substantially eliminate deleterious impurities from the separator material and to make possible the use of separator material containing a relatively high degree of impurities or in which the control of the impurity content was not completely reliable.

These and other objects of the invention will be appreciated from the following description.

The invention essentially consists of passing a cleaning agent through a wound capacitor section prior to its impregnation with an electrolyte, whereby a washing and cleaning process is carried out, the cleaning agent being subsequently removed from the capacitor section by means creating a pressure differential between the two ends of the capacitor section and by evaporation. Various means may be used for accomplishing the cleaning operation, and several cleaning agents are suitable.

For a more complete description of the invention, reference is made to the drawings of one form of apparatus, wherein:

Fig. 1 is a side view partly in section of a centrifuge apparatus embodying the invention;

Fig. 2 is a cross-sectional, plan view of the apparatus taken along the line 2—2 in Fig. 1;

Fig. 3 is an isometric view of a removable basket element in which the capacitor sections are held during the centrifuge operation; and Fig. 4 is an enlarged, end view of a wound capacitor section prior to its impregnation with electrolyte.

The apparatus shown in Figs. 1–3, which is one embodiment for carrying out the invention, includes a supporting base 10, a fixed chamber 11 which is liquid tight and has a removable cover 12. The cover is hinged at 13 and is provided with a closure device 15. A drain 16 is provided in the lower part of the chamber 11. A perforated pipe spray 17 is slidably mounted in housing 19 in the center of the cover 12 and extends down through the cover into the chamber when the cover is in closed position, as shown in Fig. 1. The slidable mounting for the pipe 17 permits it to be drawn upward, from the position shown in Fig. 1, so that when the cover is being opened and closed the lower end of the pipe does not strike the perforated chamber 23. The pipe 17 is coupled to a flexible hose 18 on the outside of the cover 12.

A motor 20 is mounted below the chamber 11 and has a shaft 21 extending upwardly through the bottom of the chamber 11. The shaft 21 is provided with a turntable 22 at its upper end.

A perforated chamber 23 is fixed on the turntable 22 for rotation with said turntable and shaft when rotation is imparted to those members by the motor 20. The bottom and the sides of the chamber 23 are formed with a plurality of perforations 25 through which liquid may pass. The upper end of the perforated chamber 23 is provided with a hood member 26 which extends inwardly from the peripheral walls of the chamber 23 and defines a relatively large, central opening.

Removable perforated baskets 27 are adapted to receive a purality of wound capacitors 28 to be cleaned. The baskets are formed with perforated walls having perforations 30 through which liquid may pass. One side 31 of each of the baskets may be open (Fig. 3), through which the capacitors may be received and removed. The removable baskets 27 are adapted to be positioned in the perforated chamber 23 around the inner wall thereof with the wound capacitors disposed with their axes substantially radial to the axis of the perforated chamber 23 and with respect to the pipe spray 17. The arrangement of the baskets 27 is illustrated in Fig. 2. Spacer members 32 are provided between the baskets to maintain them in relatively fixed position during the rotation of the chamber 23.

Suitable means may also be provided for removably fixing the baskets in the arrangement shown in Fig. 2 to prevent their shifting around during the acceleration or deceleration of the centrifuge.

A suitable control apparatus may be provided for the motor 20, at the side of the centrifuge apparatus, such as the control box 33 and control handle 35.

In order to clean the wound capacitors 28, they are placed in tiers in the baskets 27 in the manner shown in Fig. 3, and the baskets are thereafter placed in the perforated chamber 23, in the arrangement shown in Fig. 2, with the open sides 31 of the baskets facing the spray pipe 17. Handles 36 may be provided on the baskets 27 to facilitate the positioning and removal of the baskets in the perforated chamber. When the baskets 27 are in position and suitably spaced around the inner wall of the chamber 23, in the manner shown, the cover 12 is closed to the position shown in Fig. 1, and the locking device 15 engages latch 14 provided on the upper side of the chamber 11. The pipe spray 17 is slid downward to the position shown in Fig. 1. Thereafter the motor 20 is started in order to rotate the perforated chamber 23. A cleaning agent is fed through the flexible hose 18 and is sprayed into the chamber 23 through the openings 37 disposed along the length and around the circumference of the pipe spray member 17. The sprayed cleaning agent impinges against the inner ends 38 of the wound capacitor sections 28 and is drawn through the longitudinal interstices 40 (see Fig. 4) of the wound capacitor sections 28 by centrifugal force. The cleaning agent passes axially through each of the capacitor sections and is thrown off at the outer ends 41 of said sections, thereafter passing through the perforations 30 in the outer walls 42 of the baskets and the perforations 25 in the chamber 23. The differential centrifugal pressure provides a means for forcing the cleaning agent through the wound capacitor sections, so that unwanted impurities on the surfaces of the electrodes and contained in the absorbent separators may be dissolved and carried off with the cleaning agent. As the cleaning agent is thrown outwardly through the perforations 25, they impinge upon the inner wall of the chamber 11 and collect in the bottom of the chamber and are drained off through the drain 16 which is connected by suitable means such as pipes 43 to a reservoir which is not shown.

It will be appreciated that the cleaning agent can be repurified or regenerated by distillation or other means, and may be reused for subsequent cleaning operations.

As an example of this means of forcing the cleaning agent through a wound capacitor section, it has been found that an 80 mfd. 350 v. D. C. electrolytic capacitor section having a size of approximately 1" diameter and a length of approximately 3¼" may be suitably cleaned by arranging the section with its axis substantially radial in a centrifuge, applying a cleaning agent at a ratio of about 500 cubic centimeters over a period of approximately five minutes in a centrifuge chamber having an approximate size of 24" in diameter and a speed of approximately 1200 revolutions per minute. Such a size centrifugal chamber and speed will produce a differential pressure from the inner end, i. e. 38, to the outer end, i. e. 41, of approximately fifty pounds per square inch.

A suitable cleaning agent for this purpose can be any agent which has a dissolving action on the unwanted impurities. For example, it has been found that distilled water or chemically pure polyhydric alcohol, such as glycerine or ethylene glycol are satisfactory. However, the present preferred practice is to use an alcohol having relatively low evaporating temperature such as isopropyl alcohol.

After the cleaning agent has been forced through the capacitor section for a suitable period of time, no further cleaning agent is sprayed through the pipe 17. However, the rotation of the centrifuge is continued for the purpose of expelling as much of the cleaning agent as possible from the interstices of the capacitor sections by the continued differential centrifugal pressure. Thereafter, the capacitor sections are removed from the centrifuge and any residual cleaning agent is allowed to evaporate. It will be appreciated that the evaporation can be accelerated by the use of heat or heat supplemented by an evacuating means.

Thereafter the dried capacitor sections may be impregnated with a film forming electrolyte of any suitable, well known composition, such as a mixture of ammonium borate and ethylene glycol. The process of impregnation can be accomplished in any well known manner, such as vacuum impregnation or centrifugal impregnation, or by soaking in the electrolyte. The electrolyte can be easily checked in large batches before impregnating the capacitor sections so that there is no problem in maintaining adequate purity at this phase in the manufacture of capacitors.

It will be appreciated that although the method and apparatus for forcing the cleaning agent through the wound capacitor sections has been illustrated by a centrifuge, the cleaning action can also be performed by inserting a capacitor section in one end of a tube and forcing the cleaning agent through the tube and through the section or by any other suitable means in which a cleaning agent may be forced through a wound capacitor section, so that it can dissolve impurities on the surface of the electrodes and also dissolve impurities which may be in the absorbent separators and carry off such impurities.

In the operation of electrolytic capacitors, it is desirable to have as small an electrical leakage current as possible passing through the electrolyte, and unless the electrical leakage current remains below a certain maximum value, the capacitor will become heated during operation because of electrical resistance to the current flowing through the electrolyte. The heating of an electrolytic capacitor, because of these electrical losses, is cumulative, and the more elevated the temperature of the electrolyte becomes the less its specific resistance becomes, and the greater becomes the leakage current. Consequently, above a certain maximum leakage for a given size, the electrolytic capacitor may be subjected to a destructive cycle for the leakage will heat the section which will in turn increase the electrical leakage, thereby producing additional heat. This cycle continues until the capacitor is destroyed.

In an electrolytic capacitor section of the size specified above, the maximum leakage current which can be tolerated when the capacitor is operating at 85° C. is about 5 milliamperes at 350 v. Set forth below are test data indicating the leakage current for "cleaned" and "uncleaned" capacitor sections operating with an ambient temperature of 85° C. for the several cleaning agents.

CHART 1

*Test data for ethylene glycol as a cleaning agent*

| Time | Uncleaned | | | | | | | | Cleaned | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Start | .2 | .2 | .2 | .2 | .2 | .2 | .3 | .2 | .2 | .2 | .2 | .2 | .2 | .2 | .2 | .2 |
| 30 Min | 1.0 | .5 | .5 | .3 | .5 | .3 | .5 | .2 | .4 | .2 | .2 | .2 | .4 | .2 | .2 | .5 |
| 60 Min | 1.8 | 1.2 | .9 | .5 | 1.0 | .4 | 1.0 | .4 | .7 | .3 | .2 | .3 | .8 | .4 | .4 | .8 |
| 90 Min | 10 | 4 | 3.3 | 1.5 | 3.8 | 1.6 | 4.5 | 1.4 | 1.6 | .8 | .2 | .8 | 1.8 | 1.1 | 1.1 | 2.2 |
| 120 Min | All leakages over 20 ma. | | | | | | | | 3.5 | 1.3 | 3.5 | 1.5 | 3.0 | 1.8 | 1.8 | 4.0 |
| 240 Min | Test discontinued. | | | | | | | | 3.3 | 1.4 | 2.0 | .8 | 2.0 | 2.0 | 2.0 | 4.0 |

CHART 2

*Distilled water as a cleaning agent*

| Time | Uncleaned | | | | Cleaned | | | | | | | | | | | |
|---|---|---|---|---|---|---|---|---|---|---|---|---|---|---|---|---|
| Start | .3 | .2 | .3 | .2 | .2 | .2 | .2 | .2 | .2 | .2 | .2 | .2 | .2 | .2 | .2 | .2 |
| 30 Min | 1.7 | .8 | 2.0 | 1.0 | .8 | 1.0 | .4 | .7 | .7 | .8 | .6 | 1.0 | .8 | .8 | 1.7 | 1.5 |
| 60 Min | 2.8 | 1.2 | 3.0 | 1.6 | 1.0 | 1.0 | .4 | .6 | .8 | .8 | .8 | 1.0 | 1.2 | 1.0 | 2.7 | 2.2 |
| 90 Min | 4.0 | 1.5 | 4.5 | 2.2 | 1.3 | 1.5 | .6 | .8 | 1.0 | 1.2 | 1.2 | 1.6 | 1.6 | 1.3 | 3.5 | 3.0 |
| 120 Min | Leakage above | | | | .5 | .8 | .2 | .3 | .3 | .5 | .4 | .8 | 1.0 | .8 | 2.3 | 1.8 |
| 240 Min | 10 ma. discontinued. | | | | .5 | .6 | .2 | .3 | .4 | .5 | .3 | .5 | .5 | .5 | 1.0 | 1.0 |

CHART 3

*Isopropyl alcohol as a cleaning agent*

| Time | Uncleaned | | | | | | | | Cleaned | | | | | | | |
|---|---|---|---|---|---|---|---|---|---|---|---|---|---|---|---|---|
| Start | .2 | .2 | .2 | .2 | .2 | .2 | .2 | .2 | .2 | .2 | .2 | .2 | .2 | .2 | .2 | .2 |
| 30 Min | .4 | .3 | .4 | .5 | .5 | .3 | .4 | .4 | .4 | .4 | .4 | .4 | .4 | .4 | .4 | .4 |
| 60 Min | 1.4 | 1.2 | 1.3 | 1.2 | 1.7 | 1.0 | 1.5 | 1.3 | 1.0 | .8 | .8 | 1.2 | .8 | .8 | .8 | .8 |
| 90 Min | 3.4 | 2.3 | 2.7 | 3.5 | 7.0 | 6.5 | 4.0 | 2.5 | 1.7 | 1.5 | 1.7 | 2.5 | 1.7 | 1.6 | 1.5 | 1.6 |
| 120 Min | 6.0 | 3.7 | | | | | | | 2.0 | 1.8 | 2.0 | 3.5 | 2.0 | 1.8 | 1.7 | 2.5 |
| 24 Hrs | Leakage above 10 ma. | | | | | | | | .5 | .7 | .5 | .9 | .5 | 1.1 | .6 | 1.0 |
| 144 Hrs | discontinued. | | | | | | | | .2 | .3 | .2 | .5 | .2 | .5 | .3 | .6 |
| 480 Hrs | | | | | | | | | .2 | .3 | .2 | .3 | .15 | .3 | .15 | .25 |

Referring to the above charts it will be noted that in all cases the uncleaned comparative sections approached the destructive temperature and leakage cycle (i. e. something above 5.0 milliamperes) at between 1½ and 2 hours, and the cleaned capacitor sections had not approached the destructive leakage temperature cycle after four hours in the case of Charts 1 and 2, and had not approached the destructive leakage temperature cycle after 480 hours in the case of Chart 3.

A further method of cleaning the capacitor sections which has been found satisfactory is to immerse the wound sections in a cleaning agent and thereafter draw the cleaning agent from the interstices of the wound sections by means of a centrifuge or suitable evacuating apparatus. In the use of this method, however, it may be found necessary to immerse the sections in the cleaning agent more than one time.

During tests with regard to the effectiveness of the use of a cleaning agent, the cleaning agent which was thrown from the sections was collected and tested to determine the degree of cleaning which had taken place. After the first immersion of the sections in the cleaning agent and the withdrawal of the cleaning agent from the sections, a test showed that the chloride ion content in a 10 cubic centimeter sample of the cleaning agent was 3 p. p. m. (parts per million). The second wash showed a .5 p. p. m. chloride, and the third wash gave no tests for chloride at all.

It will, therefore, be appreciated from an examination of the above charts and the tests related above that the contamination and impurities which are in large part responsible for electrical losses in an electrolytic capacitor, and which may ultimately cause the failure of the capacitor, may be eliminated. It has been found that by cleaning capacitor sections in accordance with this invention, high quality electrolytic capacitors can be produced which are capable of operation at elevated ambient temperatures such as are required by miniaturization of electronic equipment.

In accordance with the provisions of the patent statutes, I have herein described the principle of operation of the invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described my invention, I claim:

1. The method of removing impurities from a wound electrolytic capacitor prior to its impregnation with electrolyte, comprising, positioning a capacitor with its axis radially oriented with respect to a centrifuge, delivering a cleaning agent to the inner end of said capacitor and causing it to move to the outer end of said capacitor by centrifugal force.

2. The method of claim 1 wherein the cleaning agent is ethylene glycol.

3. The method of claim 1 wherein the cleaning agent is distilled water.

4. The method of claim 1 wherein the cleaning agent is isopropyl alcohol.

(References on following page)

References Cited in the file of this patent

UNITED STATES PATENTS

| | | |
|---|---|---|
| 1,194,542 | Raymond | Aug. 15, 1916 |
| 1,519,443 | Douthitt | Dec. 16, 1924 |
| 1,543,345 | Thompson | June 23, 1925 |
| 2,124,052 | Clough | July 19, 1938 |
| 2,178,701 | Petre | Nov. 7, 1939 |
| 2,189,209 | Jamgotch | Feb. 6, 1940 |
| 2,211,892 | Giese | Aug. 20, 1940 |
| 2,222,676 | Mahler | Nov. 26, 1940 |
| 2,256,663 | Brewer | Sept. 23, 1941 |
| 2,319,531 | Brown | May 18, 1943 |
| 2,356,857 | Konrad | Aug. 29, 1944 |

FOREIGN PATENTS

| | | |
|---|---|---|
| 854,981 | France | Jan. 1940 |

OTHER REFERENCES

Wertheim: "Organic Chemistry," 3rd. ed., (1951), pages 120 and 123, Blakiston, Philadelphia.